Patented Aug. 6, 1929.

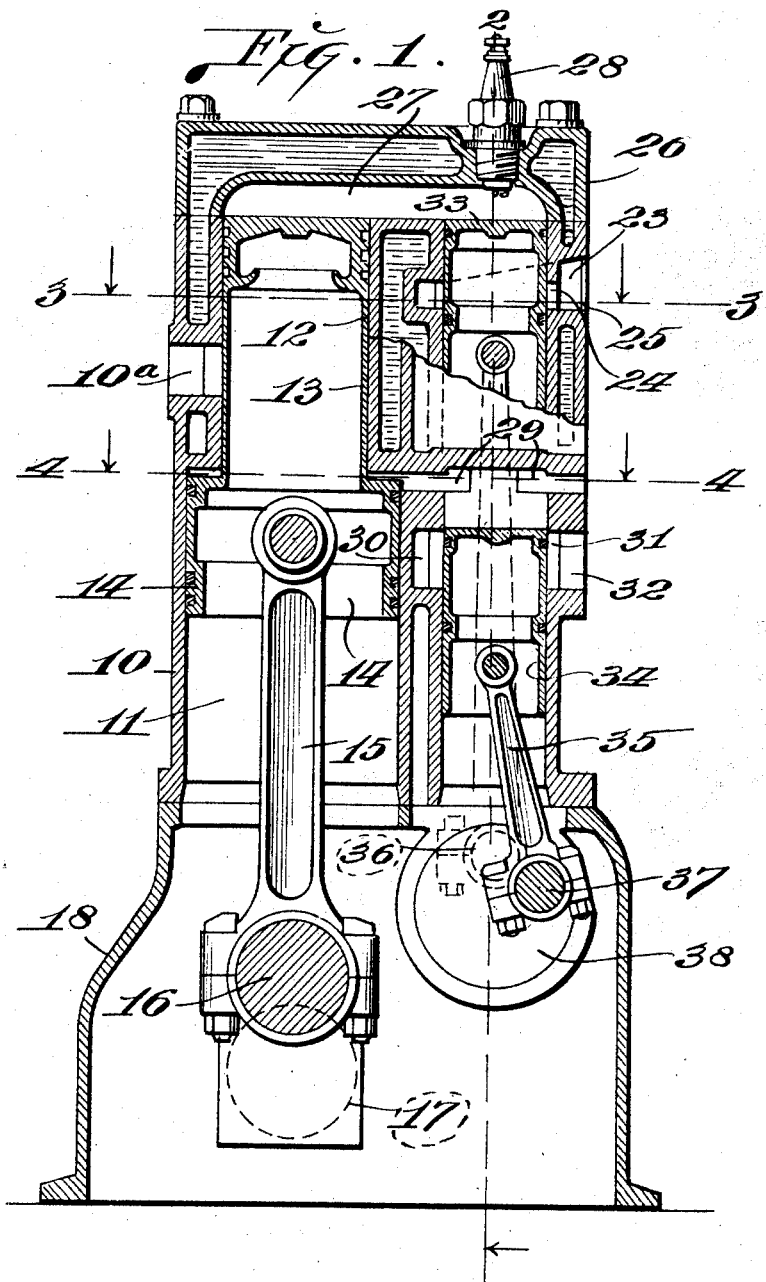

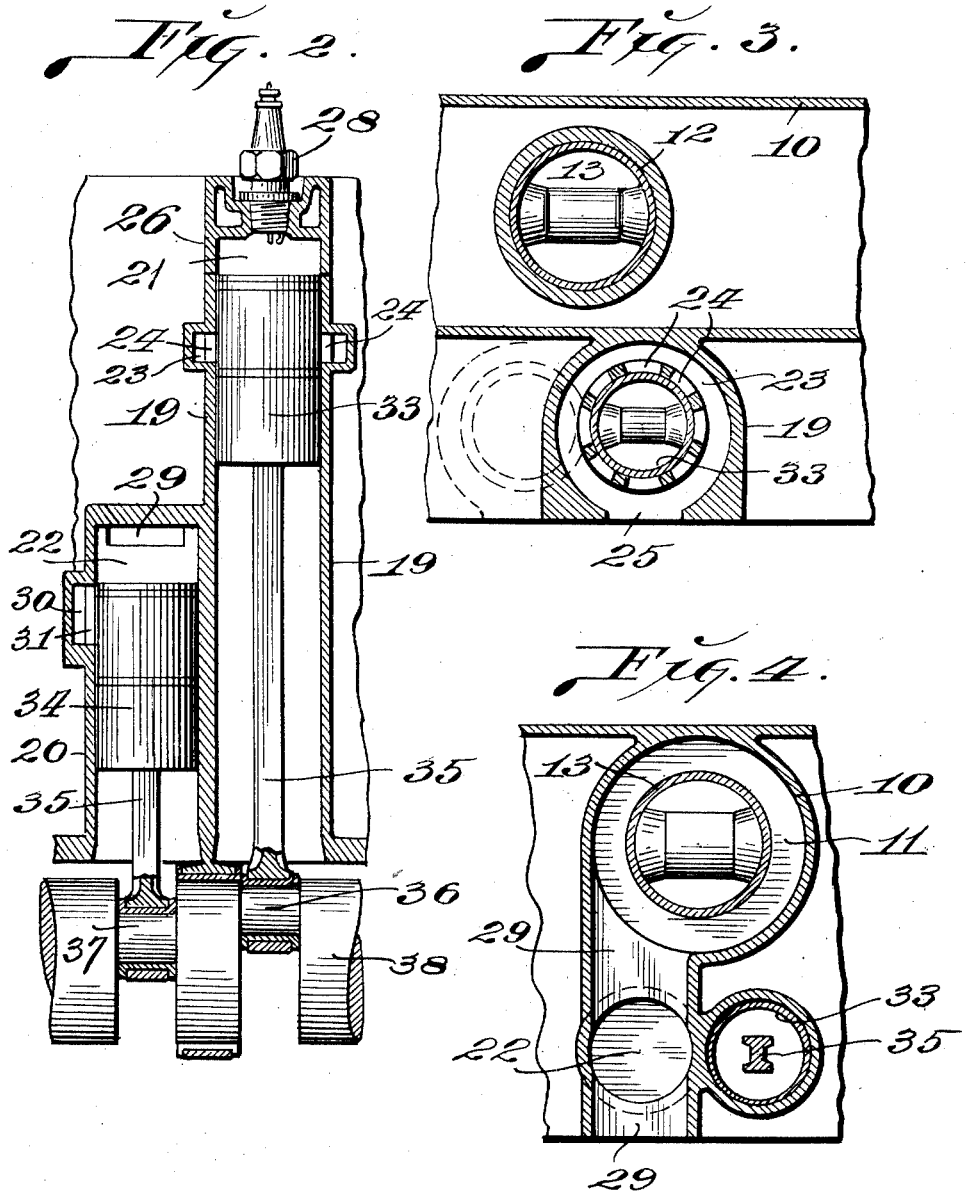

1,723,465

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed April 21, 1926. Serial No. 103,531.

My invention relates to a two stroke cycle internal combustion engine and has for its principal object the provision of an engine of relatively simple and efficient structure having positively acting valvular mechanism for controlling the admission of charge volumes to the pumping and combustion chambers and said engine being relatively compact by virtue of a small combustion chamber clearance wall area.

The engine unit contemplated by my invention comprises a two diameter cylinder which functions as a combustion cylinder and a pumping cylinder, a pair of piston valves and their cylinders for controlling the admission of charge volumes to the pumping cylinder and the combustion cylinder, the two diameter piston within the two diameter cylinder being directly connected to the throw of a main crank shaft and the two piston valves being separately connected to two throws or crank pins of an auxiliary crank shaft that operates at the same speed with the main crank shaft.

It is a recognized fact that the less the area of combustion chamber wall is in ratio to the cubic displacement of the combustion piston sweep, the greater engine efficiency will prevail as a consequence of minimum heat losses by radiation. In my improved engine the larger diameter portion of the combustion cylinder is fitted with a relatively large diameter piston of considerable stroke that functions as an exhaust valve by uncovering ports in the cylinder wall at the time lower crank end dead center is reached.

A piston of relatively small diameter is arranged for operation to one side of the main piston and cylinder, and which smaller piston has a much shorter stroke than the larger diameter piston, said smaller piston functioning as a fresh charge inlet valve by uncovering ports that are formed in its cylinder wall at the time said smaller piston passes lower dead center.

By timing the main and auxiliary crank shafts so that the same operate synchronously, or in one to one ratio, and arranging the pistons so that they move in the same direction at the same time, by properly locating the exhaust ports in the combustion cylinder wall and the fresh charge volume inlet ports in the piston valve cylinder wall, produces a very efficient and desirable residual gas scavenging effect and likewise a very desirable fresh charge induction with very little cylinder wall area added to the combustion wall area in addition to the large main combustion cylinder and clearance wall area.

It is a further object of my invention to provide an engine of the character referred to with a second side piston valve arranged parallel with the main combustion piston and the fresh charge volume inlet piston and which second side piston functions for controlling the charge volume inlet to the pumping chamber and which latter is created by the piston sweep of the head area between the periphery of the head and smaller diameter of the two diameter piston that operates in the two diameter combination combustion and pumping cylinder.

With the foregoing and other objects in view, my invention consists in certain novel features of construction and arrangement of parts that will hereinafter be more fully described and claimed and illustrated in the accompanying drawings, in which—

Fig. 1 is a transverse section taken vertically or lengthwise through the central portion of an engine power unit of my improved construction.

Fig. 2 is a vertical section taken on the line 2—2 of Fig. 1.

Fig. 3 is a horizontal section taken on the line 3—3 of Fig. 1.

Fig. 4 is a horizontal section taken on the line 4—4 of Fig. 1.

Referring by numerals to the accompanying drawings which illustrate a practical embodiment of my invention, 10 designates a cylinder having a two diameter bore, the larger diameter portion of which bore is formed in the lower portion of the cylinder block and functions as a pump chamber 11, and the portion of smaller diameter being formed in the head end of the cylinder block and functioning as a combustion chamber 12.

Arranged for reciprocatory movement within the two diameter chamber is a two diameter piston, the portion 13 of smaller diameter operating within the combustion chamber 12 and the portion 14 of larger diameter operating within the pump chamber 11. This two diameter piston is connected by a conventional connecting rod 15 to the pin of a crank throw 16 that is formed on main crank shaft 17 and the latter having suitably arranged bearings in a crank case 18. Formed through the wall of cylinder 10 and at a point where it will be uncovered and open when combustion piston 13 is at the lower end of its stroke, is an exhaust port $10_a$.

Arranged laterally of the two diameter cylinder 10 and the crank shaft 17 are piston valve housings 19 and 20, the axes of which are parallel with each other and with the axis of the two diameter cylinder.

The upper portion of the chamber within cylinder 19, and which functions as a piston valve chamber 21, occupies the same horizontal plane with the combustion chamber 12 and the chamber in cylinder 20, and which functions as a piston valve chamber 22, occupies the same horizontal plane with the pump chamber 11.

Formed in the wall of cylinder 19 and surrounding the upper portion of chamber 21 is an annular chamber 23 and leading therefrom into the upper portion of valve chamber 21 are ports 24. Annular chamber 23 is provided with an inlet port 25 which admits charge volumes that are pumped from the pumping chamber of another one of the engine units, and which may be identical in construction with the unit herein described.

Secured on top of cylinders 10 and 19 is a head block 26 in the underside of which is formed a shallow chamber 27 that functions as a common compression and combustion clearance space for the head ends of combustion chamber 12 and valve chamber 21. Seated in head 26, preferably at a point directly above valve chamber 21 is an ignition device such as a spark plug 28 and the inner ends of the electrodes thereof project into clearance chamber 27.

Leading from the upper end of pump chamber 11 to the upper end of valve chamber 22 and from the upper end of said last mentioned chamber to a transfer duct (not shown) are pump charge volume outlet ports 29. Formed in the wall of cylinder 20 and around the upper portion of chamber 22 therein is an annular chamber 30 that has communication with the upper portion of said chamber 22 through ports 31, and leading into annular chamber 30 is a charge volume inlet port 32 that may be connected to a suitable source of supply.

Arranged for operation within chamber 21 is a piston valve 33 and a similar piston valve 34 is arranged for operation in chamber 22. These pistons are connected by conventional connecting rods such as 35 to crank pins 36 and 37 respectively that are formed on auxiliary crank shaft 38. This auxiliary crank shaft which lies parallel with the main crank shaft 17 is journaled in suitable bearings in the upper portion of crank shaft 18 and said auxiliary shaft operates at the same speed as the main crank shaft, and it is preferably driven therefrom.

Cranks 36 and 37 occupy angular positions approximately 35 or 40° apart and the connections are such that piston valve 33 is timed to move or stroke synchronously with the two diameter piston 13, 14, so that inlet ports 24 and exhaust port $10_a$ are uncovered and opened practically at the same time and the connections to piston valve 34 are such that the inlet ports 31 are uncovered and open while pump piston 14 is moving downward in pump chamber 11.

In the operation of my improved engine an admitted charge volume is compressed in one clearance chamber 27 as pistons 13 and 33 move upward in their respective chambers and as said pistons pass high center, or at the point of highest compression, the compressed gaseous fuel charge is ignited by a spark produced between the terminals of the electrodes of spark plug 28. The rise in pressure following combustion of the compressed fuel charge forces the pistons downward and the power and motion thus produced are transmitted to shafts 16 and 38. As the head of piston 13 moves past port $10_a$ the products of combustion will escape through the last mentioned port and this action will be accelerated by the incoming fresh charge volume which enters the piston clearance in the upper portions of chambers 12 and 21 and the common clearance chamber 27, and which charge volume enters through port 25, annular chamber 23 and ports 24, which latter are uncovered as piston valve 23 approaches low center or the lower end of its stroke. On the succeeding upward movement of the piston 13 and piston valve 33, exhaust port $10_a$ and inlet ports 24 are closed and the admitted charge volume will be compressed in the upper portions of the chambers 12 and 21 and in the common clearance chamber 27.

During the downward movement of the two diameter piston 13, 14, the charge volume inlet ports 31 are uncovered as piston valve 34 moves downward thereby admitting to valve chamber 22 a fresh charge volume and the latter passes through the inner one of ports 29 to the annular pump chamber 11 that is produced above the larger diameter portion 14 of the piston as the latter travels downward. Inasmuch as piston valve 34 travels slightly in advance of pumping piston 14, inlet ports 31 will be covered and closed by piston valve 34 as pumping piston 14 starts to move upward and during the upward stroke of the said pumping piston the fresh charge volume drawn into pump chamber 11 will be forced out through ports 29 to a transfer duct that leads to the inlet ports of the inlet valve of another one of the engine units.

Thus it will be seen that I have provided a two stroke cycle internal combustion engine unit that embodies a two diameter combustion and pumping cylinder, a piston valve for controlling the admission of pumped charge volumes to the combustion chamber and a piston valve for controlling the admission of charge volumes to the pump chamber, and the parts are very compactly arranged with relatively little cylinder wall area so as to minimize heat losses through radiation and the two piston valves being provided with actuating means which insures positive operation in proper time relation to the movements of the two diameter combustion and pumping piston.

It will be understood that minor changes in the size, form and construction of the various parts of my improved engine unit may be made and substituted for those herein shown and described without departing from the spirit of my invention, the scope of which is set forth in the appended claim.

I claim as my invention:

In a two-stroke cycle internal combustion engine, an engine unit comprising three cylinders, one of which has two chambers of different diameters, the larger chamber functioning as a charge volume pump chamber, the smaller chamber functioning as a combustion chamber, a two-diameter piston arranged for operation within the chambers of the two-diameter cylinder, piston valves arranged for operation within the other two cylinders, the piston valve cylinders being offset with respect to the two-diameter cylinder, one of the piston valve cylinders being shorter than the other, with its upper end terminating in the same horizontal plane with the upper end of the pump chamber in the two-diameter cylinder, a port leading from the upper end of the short piston valve cylinder to the upper end of the pump chamber and a charge volume inlet port formed in the short piston valve cylinder below the port that leads to the pump chamber.

In testimony whereof I affix my signature.

EVERETT R. BURTNETT.